UNITED STATES PATENT OFFICE.

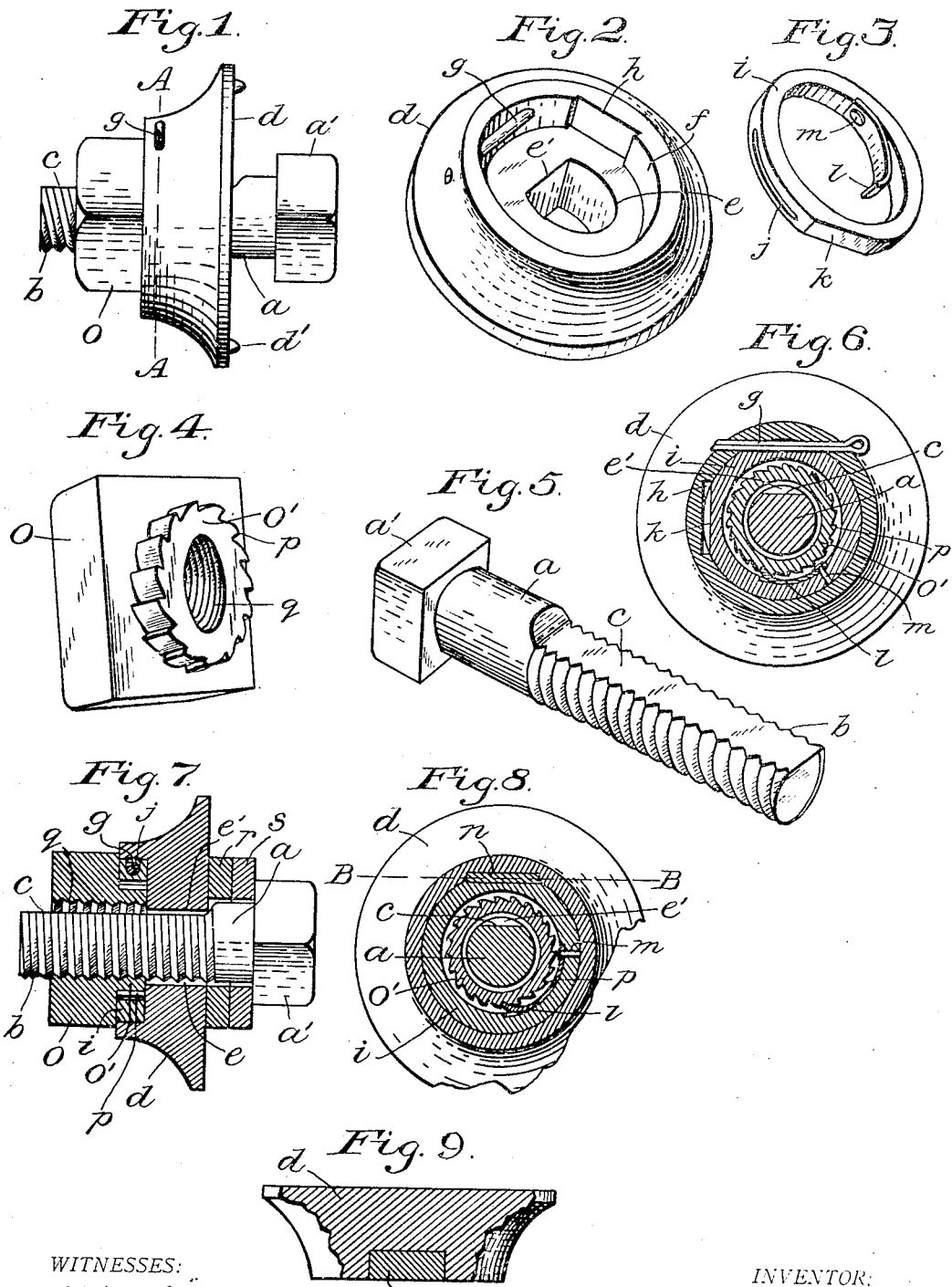

ARCHIE L. DORSEY, OF RUSSELLVILLE, INDIANA.

LOCKING NUT AND WASHER.

No. 892,507.     Specification of Letters Patent.     Patented July 7, 1908.

Application filed June 12, 1907. Serial No. 378,500.

*To all whom it may concern:*

Be it known that I, ARCHIE L. DORSEY, a citizen of the United States, residing at Russellville, in the county of Putnam and State of Indiana, have invented certain new and useful Improvements in Locking Nuts and Washers; and I do declare the following to be a full, clear, and exact description of the invention, reference being had to the accompanying drawings, and to the letters and figures of reference marked thereon, which form a part of this specification.

This invention relates to locking devices for preventing the loss of nuts from screw bolts when used on cars or other vehicles, on bridges or on machinery, and to prevent nuts from becoming loose on the bolts and detracting from their usefulness, the invention having reference particularly to nuts and washers which coöperate with a bolt to attain the desired result.

Objects of the invention are to provide reliable devices for locking nuts on bolts which will permit the nuts to be advanced so as to tighten them, and which will permit also of the removal of the nuts from the bolts without injury or damage to the locking devices, a further object being to provide locking nuts which may be produced inexpensively and be durable and economical in use.

The invention consists in a locking nut and washer and a bolt to be used in connection therewith, comprising a bolt having screw threads and a flattened side to prevent a washer from turning on the bolt, a washer having an irregular opening to receive the bolt and engage the flattened side thereof so that the washer cannot turn on the bolt, the washer being provided with a spring lock, and a nut provided with ratchet teeth and adapted to be engaged by the spring lock to prevent retraction of the nut which may be screwed onto the bolt. And the invention consists further in the novel washer and parts thereof and in the combinations and arrangements of parts as hereinafter particularly described and claimed.

Referring to the drawings Figure 1 is a side elevation of the improved locking nut and washer and bolt assembled; Fig. 2, a perspective view of the main portion of the washer; Fig. 3, a perspective view of a removable part of the washer which preferably has the spring lock mounted thereon; Fig. 4, a perspective view of the nut; Fig. 5, a perspective view of the bolt, illustrating a small size thereof; Fig. 6, a transverse sectional view on the line A A in Fig. 1; Fig. 7, a longitudinal central sectional view; Fig. 8, a sectional view somewhat similar to Fig. 6, but partially broken away and showing modifications in the means for locking the removable part to the main part of the washer; and Fig. 9, a sectional view on the line B B in Fig. 8.

Similar reference characters throughout the various figures of the drawings designate like elements or features of construction.

Practically embodied the invention comprises a bolt $a$ which may be of any suitable length and having a head $a'$, and screw threads $b$ and a flattened side $c$; a washer comprising a main part $d$ which may have projections $d'$ when intended to be used against wood, the washer having an opening $e$ to receive the bolt that has the threads thereon, the opening having a straight side $e'$ to engage the flattened portion $c$ of the bolt so that the washer will be locked against turning on the bolt. The front portion of the main part of the washer has a recess $f$ therein which is approximately circular and somewhat larger in diameter than the opening $e$. A cotter $g$ or locking pin is inserted in suitable openings in the wall of the washer part so as to extend across one side of the recess $f$ for locking the removable part of the washer to the main part thereof, another side of the recess $f$ having a recess $h$ in the face thereof to receive a locking key in case it be desired to permanently lock the removable part, in which case the cotter $g$ may be dispensed with. The removable part of the washer comprises an annular bushing $i$ that has a groove $j$ in its periphery to receive the cotter $g$, the bushing being adapted to fit into the recess $f$ of the main part, and it has a flat face $k$ which may be brought opposite the recess $h$, and the spring lock $l$ is secured against the inner side of the bushing by means of a rivet $m$, there being a key $n$ provided which may be inserted in the recess $h$ and against the face $k$ to prevent the bushing from turning rotatively with respect to the main part $d$. A nut $o$ has a projection $o'$ which is annular in configuration and has ratchet teeth $p$ on the periphery thereof, the projection being adapted to turn freely within the bushing $i$. The nut has an opening therein as usual provided with screw threads $q$ adapted to engage the threads b of the bolt. In Fig. 7 r and s designate two plates secured together by means of the bolt and nut.

In practical use the bolt may be driven tightly into the work in which it is to be used or it may be loose, and in the latter case it may be prevented from turning by using a wrench on the head a while applying the nut o thereto. Before applying the nut, the washer should be placed upon the bolt and then the nut may be screwed onto the bolt until the projection of the nut enters the bushing i and the ratchet teeth become engaged by the lock l. If it is desired that the nut may be removed, the key n will not be inserted, but the bushing will be secured by means of the cotter or pin g so that after the nut has been seated, it may be still further tightened but ordinarily cannot be retracted until after having removed the cotter or pin g, and then the nut and also the bushing may be retracted

Having thus described the invention, what is claimed as new is—

1. In a locking nut and washer, the combination of a washer with a recess in the front thereof, a bushing rotative in the recess, a spring lock having one end thereof secured to the inner side of the bushing, and means in engagement with the bushing and also the wall of the washer about the recess detachably securing the bushing to the washer, with a threaded bolt, and a threaded nut with ratchet teeth thereon for entering the bushing to be engaged by the free end of said spring lock.

2. In a locking nut and washer, the combination of a washer with a recess in the front thereof, a bushing rotative in the recess and having a groove in the periphery thereof, a locking key extending through the wall about the recess and through the groove of the bushing, and a spring lock having one end thereof secured to the inner side of the bushing, with a threaded bolt, and a threaded nut with ratchet teeth thereon for entering the bushing to be engaged by the free end of said spring lock.

3. In a locking nut and washer, the combination of a washer with a recess in the front thereof, the wall about the recess having a recess in the inner side thereof, a bushing in the recess of the washer and having a flat face at the outer side thereof, a key in the recess of the wall and engaging the flat face of the bushing, and a spring lock having one end thereof secured to the inner side of said bushing, with a threaded bolt, and a threaded nut with ratchet teeth thereon for entering said bushing to be engaged by the free end of said spring lock.

In testimony whereof, I affix my signature in presence of two witnesses.

ARCHIE L. DORSEY.

Witnesses:
   GEORGE H. SCOTT,
   THOMAS HAVERMALE.